March 24, 1959  E. ACKERLIND  2,879,499
HIGH FREQUENCY PEN RECORDER
Filed July 23, 1954  2 Sheets-Sheet 2
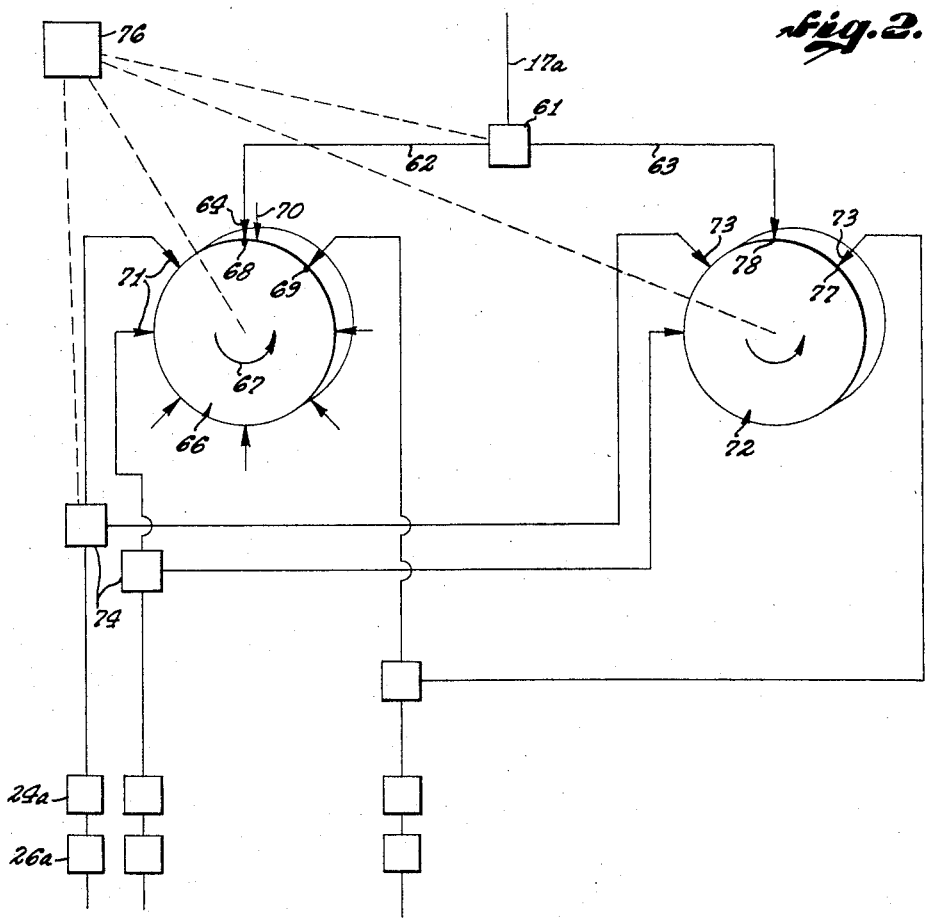
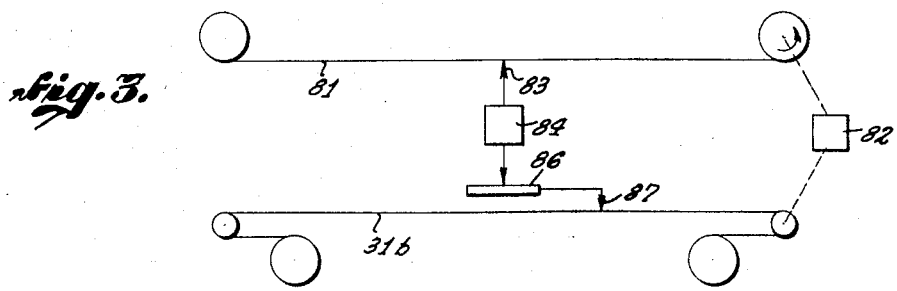
ERIK ACKERLIND,
INVENTOR.
HUEBNER, BEEHLER,
WORREL & HERZIG,
ATTORNEYS.
BY Warren T. Jessup United States Patent Office  2,879,499
Patented Mar. 24, 1959

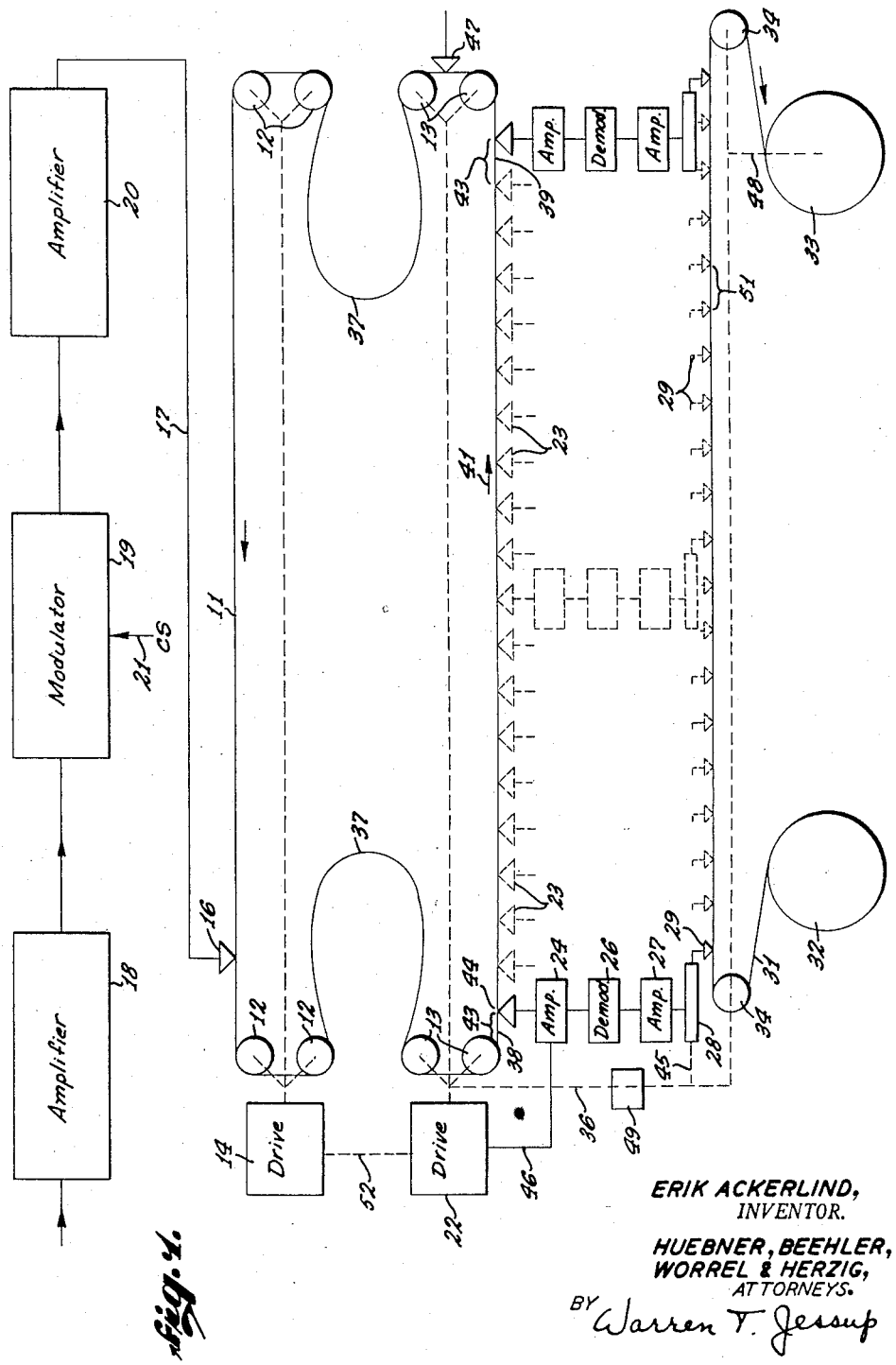

2,879,499

HIGH FREQUENCY PEN RECORDER

Erik Ackerlind, Redondo Beach, Calif.

Application July 23, 1954, Serial No. 445,338

14 Claims. (Cl. 340—174)

This invention relates to the recording of phenomena and is particularly directed to an improved apparatus and method for faithfully recording high frequency phenomena.

In the recording of many types of test data, it is necessary that the recorder have a frequency response varying from zero to about 3000 cycles per second. It is additionally desirable that the recording thus made be promptly available in the form of a visual record or trace plotted, or otherwise permanently represented, on an elongate recording medium such as a roll of recording paper.

There are presently known two principal types of visual permanent records as above described. One such type involves a photographic representation of the trace, and is made, for example, by directing a laterally oscillating light beam upon a moving photographic roll of paper. This method has the disadvantage of involving expensive recording media, namely, photographic paper, and requiring some form of continuous development and fixation of the photographic roll.

Another common method of tracing or permanently recording phenomena is that of the pen recorder, in which a writing instrument such as a tracing pen is caused to move back and forth laterally across a piece of recording paper, as for example, a roll of graph paper, which is continuously moved longitudinally beneath or opposite the tracing pen. Such direct writing recorders as are presently known have the shortcoming of not being able to respond to more than about 150 cycles per second at the most. Thus, they obviously fall short of satisfying any requirement for faithful frequency response up to the neighborhood of 3000 cycles per second.

It is an object of this invention to provide recording apparatus for directly recording high speed or high frequency phenomena with a direct writing instrument.

It is another object of this invention to provide such a high frequency recording apparatus without requiring re-design of the presently known writing-recording instruments which have an inherent low frequency limitation.

It is another object of this invention to provide such a high frequency recording apparatus that employs presently known standardized components readily commercially available.

It is a further object of this invention to provide a recording apparatus as above described which may be kept continually calibrated to show the correct reading at all times.

It is a still further object of this invention to provide a recorder as above described which is sturdy, reliable and simple to operate.

In accordance with these and other objects which will become apparent hereinafter, preferred embodiments of the invention will now be described with reference to the accompanying drawings, which are schematic diagrams illustrating the present invention.

In the drawings:

Fig. 1 is a schematic diagram of a first form of the present invention;

Fig. 2 is a schematic diagram illustrating how a portion of the apparatus in Fig. 1 may be modified to form a second embodiment of the present invention; and Fig. 3 is a schematic diagram illustrating a third form of the present invention.

The apparatus of the present invention comprises a first storage or recording medium effective to receive and store phenomena. This storage or recording medium may take any suitable form, as, for example, a closed loop of magnetic tape (to be described specifically hereinafter) an open length of magnetic tape which travels from one reel to the other, one or more recording drums (to be described specifically hereinafter), or one or more recording discs. Where the recording medium is physically flexible, as in the case of a magnetic tape, only one such medium is required to effect continuous storage, since a loop may be formed which can vary in length throughout the cycle of the recording medium. Where no such flexibility is present, as in the case of a drum or of a disc, two such recording media are required for continuous recording, as will be more fully explained hereinafter.

In the present example this recording medium takes the form of an elongate member, preferably a magnetic tape 11. In accordance with the present invention, it is preferred that the tape 11 be endless, so that it may circulate continuously and thus be continually erased for reuse, and to this end the tape 11 is mounted on a plurality of sprockets which permit such endless circulation of the tape. There are essentially two sets of such sprockets, the first set being denoted by the numerals 12 and the second set by the numerals 13. The sprockets 12 are all driven at the same speed by a drive means shown schematically at 14. Such drive means may be any suitable motor, and is preferably an electric motor coupled suitably to each of the sprockets 12. The upper portion of the magnetic tape 11 is thus driven by the motor 14 at the normal recording speed (M) of the tape.

Positioned in recording relation to the upper portion of the tape is a recording means in the form of a magnetic recording head 16 which receives the phenomena, in the form of an electric signal, from a connection shown schematically at 17. The original signal carrying the phenomena to be recorded is applied to an amplifier 18 and thence to a modulator 19 where the phenomena signals serve to modulate a signal capable of carrying modulation, called hereinafter the carrying signal CS and applied also to the modulator 19, as shown schematically by the arrow 21. The carrying signal thus modulated, is again amplified in 20 and then applied to the recording head 16 through the connection 17. Thus the phenomena to be recorded are recorded on the tape 11 as the modulating signal of a higher frequency carrying signal CS.

The frequency range capacity of the magnetic tape 11 is very high, and thus the tape 11 is able to satisfactorily record a high frequency signal MCS, modulated with the phenomena signal, which in the present example it is contemplated may go up to the neighborhood of 3000 cycles per second.

While modulation at 19 is not always essential, it is generally desirable in order to preserve any un-alternating or D.C. component in the input signal applied to the amplifier 18. This is because many recording mechanisms, including the magnetic tape recorder to be described hereinafter, are sensitive only to changes in voltage rather than to absolute values. Any type of modulation applied to any type of modulation carrying signal may be employed for this purpose.

For example, the carrying signal CS applied at 21 may be a simple high frequency sine wave, which may be amplitude modulated, frequency modulated or phase modulated in the modulator 19. Alternatively, the signal CS may be a series of pulses, and the modulation applied at 19 may be some form of pulse time modulation, such as pulse width, pulse duration, pulse position; or pulse frequency modulation; or the pulses may be amplitude or code modulated.

In its endless circuit, the magnetic tape 11 is also driven for a portion of the time by the sprockets 13. The sprockets 13 are all driven from a common motive source 22. The motive source 22 is any suitable means for alternately driving the sprockets 13 at a relatively high speed (F) and then at a relatively low speed, the low speed being but a fraction of the normal speed (M) of the tape 11 as it passes the recording head 16, and the high speed (F) being appreciably higher than the normal speed (M) of the tape 11 past the recording head 16.

Positioned in pick-off relation to the lower portion of the magnetic tape 11, under control of the sprockets 13, are a plurality of pick-off means or play-back heads 23. The play-back heads 23 are spaced along the tape 11 at equal intervals, so that as the tape 11 is moved by the sprockets 13, all of the play-back heads 23 receive certain portions of the phenomena simultaneously, each head 23 picking off a different, pre-selected fraction of the complete phenomena, as it then stands recorded on the lower portion of the tape 11 disposed between the spaced pairs of sprockets 13.

The output of each play-back head 23 is fed to an amplifier 24 and thence to a de-modulating circuit in the form of a demodulator 26 which removes the carrying signal component CS and restores the modulating signal. The de-modulated signal is then again amplified at 27 and applied to a pen motor 28, which drives an inking pen 29 in the well known manner. The pen 29 is caused to oscillate or reciprocate laterally across a second storage or recording medium in the form of an elongated tape such as a tape of paper 31. The paper tape 31 is fed from a roll 32 in unmarked condition and is stored in a take-up reel 33 with the inked trace of the stored phenomena thereon. The portion of the tape which passes the pen motors 28 is controlled by a pair of sprockets 34 which are driven in synchronism with the two-speed drive means 22, as shown by the schematic connection 36.

Let it be assumed that a frequency ratio R, between the actual signal applied to the amplifier 18 and the same signal as it appears at the pen 29, is desired. Thus, if it is desired that a signal which actually has a frequency of 3000 cycles per second, when applied to the amplifier 18, should appear as a frequency of 150 cycles at the pen motor 28, then R would be 20, that being the frequency ratio between the signal as applied and the signal as derived at the pen motor 28. Let it be further assumed that the portion of the tape 11 between the spaced pairs of sprockets 12 is driven continuously at a constant speed M by the drive means 14. The portion of the tape 11 residing at or opposite the play back heads 23 is driven intermittently, first at a low speed, then at a high speed F, and then at the low speed, etc. This is effected through the two-speed drive means 22 as described hereinbefore. Since the sprockets 12 do not turn in synchronism with the sprockets 13, it is necessary to provide room for variable loops 37 in the tape 11 between the upper portion of the tape 11, controlled by the sprockets 12, and the lower portion controlled by the sprockets 13.

Let it be assumed that the apparatus is in the attitude shown in Fig. 1 and that the lower portion of the tape 11 between the points 38 and 39 has stored thereon a signal or phenomenon which it is desired to pick off and re-apply to the visual recording tape 31 by the pens 29. While the motor means 14 steadily drives the upper portion of the tape 11 at the normal speed M, the two-speed drive means 22 drives the lower portion of the tape 11, between the numerals 38 and 39, in the direction shown by the arrow 41. The initial phase of the operation by the drive means 22 is done at a relatively slow speed S, which is equal to $M/R$. The lower portion of the tape 11 is thus driven at slow speed for a distance 43 equal to the space between any two recording heads 23. After this distance has been traversed by the lower portion of the tape 11, under the control of the sprockets 13, it will be noted that, although done segmentally, the entire lower interval of tape 11, between the numerals 38 and 39, has been subjected to the pick-off action of pick-off heads 23. Thus, all portions of the signal on the tape 11, between the points 38 and 39, have been picked off by the aggregate of the pick-off heads 23.

As soon as the distance 43 has been traversed by the lower portion of the tape 11, the tape is moved rapidly ahead, during the high speed phase of the drive means 22, until the point on the tape 11 which was originally at 38 (and was during the slow phase moved to the position 44) has been moved to the position 39. This rapid movement of the lower portion of the tape 11 is effected at a fast speed F. As soon as this rapid drawing or traverse of the tape 11 has been effected, it will be noted that a completely new interval of tape 11 has been brought opposite the play-back heads 23 between the points 38 and 39.

During the slow speed phase S of the drive means 22, the pen motors 28 are in operation, driving their respective pens 29 so as to record that particular fraction of the signal on the corresponding segment of the tape 31. During the rapid traverse F of the lower portion of the tape 11, the signal link from the playback heads 23 to the pen motors 28 is kept open, by suitably cutting off their respective amplifiers 24 through a circuit connection, shown schematically at 46 and actuated in accordance with the speed cycle of the two speed drive means 22. Also during the rapid traverse F of the tape 11, the pens 29 are lifted from the paper tape 31, in order that the removal of signal from the amplifiers 24 will not cause them to show a trace dropping down to zero value. Such lifting of the pens may be effected by any suitable linkage 45 actuated in accordance with the two-speed drive mechanism 22.

It will be readily seen that the frequency ratio R is equal to the ratio between the relative speed between the tape 11 and the recording head 16, and the relative speed between the tape 11 and the playback heads 23. Thus, if a frequency ratio of 20 is desired, cutting 3000 cycles per second down to 150 cycles per second, the slow speed S must be equal to $\frac{1}{20}$ of the normal recording speed M, as in the general case, $S=M/R$.

It may be shown that the number, N, of playback heads 23 and recording pens 29 required, in order to effectuate a predetermined desired frequency ratio is given by the following relation:

$$N=\frac{R-M/F}{1-M/F}$$

Where R is the desired frequency ratio; M is the normal or mean recording speed of the tape 11, i.e., the speed of the tape 11 past the recording head 16; and F is the fast speed at which the lower portion of the tape 11 is drawn during the high speed phase of the drive cycle of the drive mechanism 22.

It will be readily seen that the higher the ratio of F to M, the closer will the number of required playback heads approach the frequency response ratio.

For example, let it be assumed that the normal recording speed M of the tape 11 is 6 inches per second. Let it further be assumed that the tape 11 is capable of being driven rapidly at a speed of 25 inches per second during the high speed phase or run of the drive mechanism 22. In this case the ratio M/F is 6/25. Let it further be assumed that the desired frequency ratio R is 20; that is to say, it is desired that a 3000 cycle signal at the amplifier 18 should appear at the pen motor 28 as a 150 cycle signal. With these figures, N comes out to be equal to 26. Thus if 26 playback heads 23 and a corresponding number of pen motors 28 are employed, the resulting frequency ratio will be 20.

In the above numerical example, it has been assumed that the tape 11 is accelerated and decelerated in an infinitely short time between its two different speed phases. In actual practice, of course, a definite time is required to accelerate and decelerate the tape 11 between the two phases of its operating cycle. This factor, however, merely necessitates that a somewhat larger number of playback heads and pen motors, than indicated by the above formula, are required in order to accommodate for the brief acceleration and deceleration intervals of the lower portion of the tape 11.

Once the signal on the lower portion of the tape 11 has been picked off by the playback heads 23, it may be erased from the tape; and to that end an erasing head, shown schematically at 47, is provided. The erasing head may either follow immediately after the playback heads 23, as shown in the drawing, or may be incorporated in the recording head 16 immediately ahead of the actual recording portion, as is often done in tape recorders.

The take-up reel 33 may either be driven in synchronism with sprockets 34, as shown by the schematic dotted line 48, or may be driven independently through a slip-clutch mechanism so as to always keep that portion of the tape 11 between the take-up reel 33 and the last sprocket 34 reasonably taut.

While the paper tape 31 constituting the second recording medium must be driven in synchronism with the lower portion of the tape 11, it need not necessarily be driven at the same speed. If the distance between adjacent pens 29 is the same as the distance between adjacent playback heads 23, then the speed of the lower portion of the tape 11 must be the same as that of the paper recording tape 31. However, if the distance between pens 29 is different from the distance between the playback heads 23, then there must be a proportionate ratio between the speed of the paper tape 31 and the magnetic tape 11. Thus, in the general case, a speed ratio means, such as suitable gearing 49, is shown in the connecting link 36, in order to cover the generalized case wherein the distance 51 between pens 29 is different from the distance 43 between playback heads 23. If the distance 51 is equal to the distance 43, then the speed ratio effected by the ratio means 49 is equal to 1. It will be readily understood that the speed ratio means 49 shown in the drawing is merely schematic, and such a speed ratio may be effected by a suitable tooth ratio between the sprockets 13 and the sprockets 34; the ultimate criterion being the linear speeds of the paper tape 31 and the magnetic tape 11.

It is desirable to coordinate or synchronize the speeds of operations of the two drive means 14 and 22, in order to effect proper relation between M, S, and F; and for that purpose a synchronizing or drive link, shown schematically at 52, is provided.

The invention may also be practiced in the form illustrated in Fig. 2. In this case, the incoming signal is amplified and then used as the modulating signal, by being applied to a suitable carrying signal CS, as in Fig. 1. This modulated carrying signal may be amplified, as in the case of the apparatus illustrated in Fig. 1, and then applied through the connecting lead 17a to a switching circuit 61. The switching circuit 61 has two substantially identical outputs, 62 and 63.

The output 62 feeds a recording head 64, which serves to apply and store the signal on a rotating disc or drum 66, that turns counter-clockwise, as illustrated by the arrow 67. During the application of the signal to the drum 66, the drum turns at normal speed until the point 68 on the drum has reached the position 69. The point 68 is opposite the recording head 64, as shown in Fig. 2, and the position 69 is opposite the last of a plurality of pick-offs 71. Thus, when this portion of the signal has been applied to the drum 66, each of the pick-offs 71 will be in position to receive its predetermined fraction of the message.

The drum 66 is then slowed down to a fraction of its normal speed and turned, still in the direction 67, until the point originally at 68 has moved from 69 back to the location 68. During this portion of the cycle, the signal is being fractionally picked off by the pick-offs 71 and transmitted to the respective amplifiers 24a, demodulators 26a, and on to the pen motors, in the same manner illustrated in Fig. 1.

Suitable erasing means in the form of an erasing head 70 is located immediately ahead of the recording head 64, in order to erase the record and prepare the drum for a next segment of recording. Thus, when the point has returned to the position 68, the drum is again ready to be accelerated to its normal speed and to receive the signal from the input lead 17a. In the case of the drum modification illustrated in Fig. 2, a high speed portion of the cycle is not required. Thus, the number N of playback heads 71 required is equal to R, the desired frequency ratio, except for acceleration and deceleration time, as noted hereinbefore.

During the slow speed run of the drum 66, the signals coming in on the lead 17a must be shut off from the output lead 62. In order that the signals may also be preserved and recorded on the recording tape by the pens 29, a second drum 72 is provided, which is substantially identical in construction and operation to the drum 66, except that it operates alternately with the drum 66. Thus, while the drum 66 is running through the slow speed portion of its cycle, the drum 72 is running through its normal speed and the signal is being recorded thereon; then while the signal is being picked off from the drum 72 by the plurality of pick-off heads 73, the drum 66 is again operating at normal speed and recording signals through the recording head 64.

Suitable switching circuits 74 are provided in the output leads connecting the pick-off heads 71—73 and the amplifiers 24a, for the purpose of selectively switching between the drums 66 and 72. The entire switching mechanism is coordinated, along with the alternate speed operation of the drums 66 and 72, by a master control circuit or mechanism illustrated at 76.

The control 76 switches the output of switching circuit 61 toward the drum 66, the inputs of circuits 74 toward the drum 72, and simultaneously starts the normal speed run of the drum 66 and the slow speed run of the drum 72. When the drum 66 has rotated at its normal speed so that the point 68 has been brought to the position 69, the drum 72 will have rotated from the point 77 to the position 78. Thus, while the drum 66 is receiving and storing a signal segment, the previous signal segment is being slowly picked off the drum 72 by the pick-offs 73 and transmitted through the circuits 74 to the pens 29 (Fig. 1). The control mechanism 76 then switches the operation causing the incoming signal to be directed to the lead 63 and cutting off the lead 62; simultaneously the pickoffs 73 are isolated from the amplifiers 24a by the circuits 74 and the pick-offs 71 are connected thereto. Also, at this point, normal speed operation of the drum 72 is instituted, and slow speed operation of the drum 66 is instituted.

In this manner, the two drums alternate in storing the signal at normal speed and delivering the stored signal at slow speed. Thus a continuous signal received over the input lead 17a may be continuously fed out in segmental fashion to the recording tape 31 (Fig. 1).

Where it is not required to have the signal promptly available for visual inspection, the modification illustrated in Fig. 3 may be employed. In Fig. 3, an apparatus is shown having a continuous elongate recording member or tape 81 on which the signal has been previously stored at normal recording speed. To re-record the signal from the storage medium 81 on to the tape 31b, where it may be visually inspected, both the tape 81 and the tape 31b are driven in synchronism by a suitable drive 82, at a speed greatly reduced from the normal speed, in accordance with the teachings described hereinbefore. Thus the tape 81 passes the pick-off head 83 very slowly so that high frequency signals on the tape 81 are reduced to a fraction of their normal frequency. The signal picked off at 83 is suitably amplified at 84 and applied to a pen motor 86 having a pen 87 which writes upon the tape 31b. It will be seen that in the modification shown in Fig. 3, only one pen motor 86 is required, instead of a plurality of pen motors.

While the instant invention has been shown and described herein in what is conceived to be the most practical and preferred embodiments, it is recognized that departures may be made therefrom within the scope of the invention which is therefore not to be limited to the details disclosed herein but is to be accorded the full scope of the claims.

What is claimed is:

1. Apparatus for recording high frequency phenomena comprising: a first recording medium having phenomena recorded thereon; a plurality of pick-off means for picking off said phenomena from spaced portions of said first recording medium; a second recording medium; a plurality of second recording means connected respectively to said plurality of pick-off means and positioned in recording relation to said second recording means at spaced intervals with respect thereto; and drive means for effecting relative movement between said second recording medium and said plurality of second recording means whereby each of said second recording means records a given portion of said phenomena on a given portion of said second recording medium.

2. Apparatus for recording high frequency phenomena comprising an endless, elongate, magnetic recording medium; means mounting said medium to be circulated continuously; magnetic recording means for applying said phenomena to said recording medium; drive means for moving said medium with relation to said recording means at a given speed, whereby said phenomena are applied to and stored magnetically on said magnetic medium at a given speed; a plurality of pick-off means disposed at spaced points along said magnetic recording medium for picking off said phenomena from spaced portions of said magnetic medium; second drive means for alternately moving said magnetic medium past said plurality of pick-off means at a speed which is a fraction of said given speed and at a speed which is appreciably greater than said given speed; a second elongate recording medium adapted to be written upon by writing instrument means; a plurality of writing instrument means disposed in writing relation to said second recording medium and at spaced intervals therealong; a plurality of translating means for transmitting the phenomena picked off by said plurality of pick-off means to the respective said writing instrument means; and means for controlling the transmission of said phenomena from said pick-off means to said writing instrument means in accordance with the operation of said second drive means.

3. Apparatus for recording high frequency phenomena comprising: a source of carrying signals; modulating means for applying a phenomenon carrying signal to modulate said carrying signal; a first recording medium, a first recording means for recording said modulated carrying signal on said first recording medium; means for effecting relative movement between said first recording means and said first recording medium whereby said signal is recorded on said first medium at a given speed; a plurality of pick-off means for picking off said signal from different fractions of said first recording medium; means for effecting relative movement between said plurality of pick-off means and said first recording medium at a speed different than said first mentioned speed; de-modulating means for de-modulating the respective signals picked off by said plurality of pick-off means, thereby to re-create said phenomenon signal in fractional parts; a second recording medium; and second recording means for recording the phenomenon signal on said second recording medium.

4. Apparatus for recording high frequency phenomena comprising: an endless cyclic recording medium, first recording means for recording said phenomena on said endless medium, pick-off means for picking off said phenomena from said first recording medium, a storage medium, second recording means for recording the phenomena picked off by said pick-off means on said storage medium, first drive means for driving said endless recording medium past said first recording means at a substantially constant recording speed, and second driving means for driving said endless recording medium past said pick-off means, alternately, at a substantially constant pick-off speed which is less than said recording speed and at a catch-up speed which is appreciably greater than said recording speed.

5. Apparatus for recording high frequency phenomena comprising: an endless cyclic recording medium, first recording means for recording said phenomena on said endless medium, pick-off means for picking off said phenomena from said first recording medium, a storage medium, second recording means for recording the phenomena picked off by said pick-off means on said storage medium, first drive means for driving said endless recording medium past said first recording means at a substantially constant recording speed, and second drive means for driving said endless recording medium past said pick-off means at a substantially constant pick-off speed which is less than said recording speed.

6. Apparatus for recording high speed phenomena comprising an endless cyclic recording medium, first recording means for recording phenomena on said endless medium, a plurality of pick-off means for picking off said phenomena from spaced points on said endless medium, a storage recording medium, second recording means for recording the phenomena picked off by said plurality of pick-off means on said storage recording medium, first drive means for driving said endless recording medium past said first recording means at a substantially constant recording speed, second drive means for driving said endless recording medium past said plurality of pick-off means, alternately, at a substantially constant pick-off speed which is less than said recording speed and at a catch-up speed which is appreciably greater than said recording speed.

7. Apparatus for recording high speed phenomena comprising an endless cyclic recording medium, first recording means for recording phenomena on said endless medium, a plurality of pick-off means for picking off said phenomena from spaced points on said endless medium, a storage recording medium, second recording means for recording the phenomena picked off by said plurality of pick-off means on said storage recording medium, first drive means for driving said endless recording medium past said first recording means at a substantially constant recording speed, and second drive means for driving said endless recording medium past said plurality of pick-off means at a substantially constant pick-off speed which is less than said recording speed.

8. Apparatus according to claim 6 including means for coordinating the relative speed between said storage recording medium and said second recording means with the alternate pick-off speed and catch-up speed drive operations of said second drive means.

9. Apparatus for recording high speed phenomena comprising: a first recording medium in the form of an endless elongate member effective to receive and store phenomena thereon; a first recording means for recording phenomena on said first medium; first drive means for moving said first medium past said first recording means at a given speed; a plurality of pick-off means for simultaneously picking off said phenomena from spaced points on said first medium; second drive means for moving said first medium past said plurality of pick-off means alternately at a speed which is a fraction of said given recording speed and at a speed which is appreciably greater than said given recording speed; a second recording medium; and means for recording the phenomena picked off by said plurality of pick-off means on said second recording medium.

10. Apparatus for recording high speed phenomena comprising: a first recording medium in the form of an endless elongate recording member effective to receive and store phenomena thereon; a first recording means for recording phenomena on said first medium; first drive means for moving said first medium past said first recording means at a given speed; a plurality of pick-off means for simultaneously picking off said phenomena from spaced points on said medium; second drive means for moving said first medium past said plurality of pick-off means alternately at a speed which is a fraction of said given recording speed and at a speed which is appreciably greater than said given recording speed; a second recording medium; means for recording the phenomena picked off by said plurality of pick-off means on said second recording medium; and erasing means for erasing phenomena stored on said first medium prior to the recording of new phenomena by said first recording means.

11. Apparatus for recording high speed phenomena comprising a first recording medium in the form of an endless elongate member effective to receive and store phenomena thereon; a first recording means for recording phenomena on said first medium; first drive means for moving said first medium past said first recording means at a given speed; a plurality of pick-off means for simultaneously picking off said phenomena from spaced points on said first medium; second drive means for moving said first medium past said plurality of pick-off means alternately at a speed which is a fraction of said given recording speed and at a speed which is appreciably greater than said given recording speed; a second recording medium in the form of a tape adapted to be written upon; and writing instrument means energized respectively by said plurality of pick-off means for recording the phenomena picked off by said plurality of pick-off means on said tape.

12. Apparatus for recording high frequency phenomena comprising: a first recording medium in the form of an elongate magnetic member having phenomena recorded thereon; a plurality of pick-off means for picking off said phenomena from spaced portions of said first recording medium; a second recording medium; a plurality of second recording means connected respectively to said plurality of pick-off means and positioned in recording relation to said second recording means at spaced intervals with respect thereto; and drive means for effecting relative movement between said second recording medium and said plurality of second recording means, whereby each of said second recording means records a given portion of said phenomena on a given portion of said second recording medium.

13. Apparatus for recording high frequency phenomena comprising: a first recording medium in the form of an elongate magnetic member having phenomena recorded thereon; a plurality of pick-off means for picking off said phenomena from spaced portions of said first recording medium; a second recording medium in the form of a tape adapted to be written upon; a plurality of second recording means in the form of writing instrument means energized respectively by said plurality of pick-off means and positioned in writing relation to said tape at spaced intervals with respect thereto; and drive means for effecting relative movement between said second recording medium and said plurality of second recording means, whereby each of said second recording means records a given portion of said phenomena on a respective portion of said second recording medium.

14. Apparatus for recording high frequency phenomena comprising an endless cyclic recording medium; first recording means for recording said phenomena on said endless medium; pick-off means for picking off said phenomena from said first recording medium; a storage medium; second recording means for recording the phenomena picked off by said pick-off means on said storage medium; first drive means for driving said endless recording medium past said first recording means at a given speed and past said pick-off means at a pick-off speed which is a fraction of said given speed; and second drive means responsive to operation of said first drive means for driving said storage medium in synchronism with said endless recording medium alternately at a relatively low speed and at a relatively high speed.

References Cited in the file of this patent
UNITED STATES PATENTS

| | | |
|---|---|---|
| 1,555,281 | Engl et al. | Sept. 29, 1925 |
| 2,006,961 | Moore | July 2, 1935 |
| 2,286,072 | Dudley | June 9, 1942 |
| 2,306,435 | Graham | Dec. 29, 1942 |
| 2,364,210 | Guanella | Dec. 5, 1944 |
| 2,406,353 | Myers | Aug. 27, 1946 |
| 2,546,829 | Mallina | Mar. 27, 1951 |
| 2,714,202 | Downing | July 26, 1955 |